United States Patent
Hitchcock et al.

(10) Patent No.: US 9,721,282 B2
(45) Date of Patent: Aug. 1, 2017

(54) MERCHANT VERIFICATION OF IN-PERSON ELECTRONIC TRANSACTIONS

(75) Inventors: Daniel W. Hitchcock, Bothell, WA (US); Darren E. Canavor, Redmond, WA (US); Harsha Ramalingam, Kirkland, WA (US); Robert Hanson, Seattle, WA (US); Brad Lee Campbell, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 393 days.

(21) Appl. No.: 13/372,822

(22) Filed: Feb. 14, 2012

(65) Prior Publication Data

US 2013/0151419 A1 Jun. 13, 2013

Related U.S. Application Data

(63) Continuation-in-part of application No. 13/313,912, filed on Dec. 7, 2011.

(51) Int. Cl.
*G06Q 40/00* (2012.01)
*G06Q 30/06* (2012.01)
(Continued)

(52) U.S. Cl.
CPC .......... *G06Q 30/06* (2013.01); *H04L 9/3226* (2013.01); *H04W 4/021* (2013.01); *H04W 12/06* (2013.01);
(Continued)

(58) Field of Classification Search
USPC ........................................................ 705/64
See application file for complete search history.

(56) References Cited

U.S. PATENT DOCUMENTS

| 7,200,566 B1 | 4/2007 | Moore et al. |
| 8,403,215 B2 | 3/2013 | Aihara et al. |

(Continued)

FOREIGN PATENT DOCUMENTS

| JP | 2001175752 | 6/2001 |
| JP | 2001297278 | 10/2001 |

(Continued)

OTHER PUBLICATIONS

The Extended European Search Report mailed Jul. 10, 2015 for European patent application No. 12855577.8, 7 pages.

(Continued)

*Primary Examiner* — William Rankins
(74) *Attorney, Agent, or Firm* — Lee & Hayes, PLLC

(57) ABSTRACT

Validation data, such as an image selected by a merchant, is rendered on a mobile device of a customer to provide the merchant confirmation that payment for an item submitted through the mobile device of the customer was in fact received by the merchant. The merchant may establish an account on a network-accessible computing device (e.g., in the "cloud") that includes the validation data. The customer authorizes payment to the merchant from the mobile device using the network connectivity of the mobile device. When the payment is received by the merchant, the network-accessible computing device sends the validation data to the customer's mobile device. The merchant may be confident that he or she has in fact received an electronic payment from the customer when the validation data is presented on the mobile device. Techniques to prevent reuse and copying of the validation data are also discussed.

25 Claims, 13 Drawing Sheets

(51) Int. Cl.
*H04L 9/32* (2006.01)
*H04W 12/06* (2009.01)
*H04W 4/02* (2009.01)
*H04W 12/10* (2009.01)

(52) U.S. Cl.
CPC ...... *H04L 2209/56* (2013.01); *H04L 2209/80* (2013.01); *H04W 12/10* (2013.01)

(56) References Cited

U.S. PATENT DOCUMENTS

| | | |
|---|---|---|
| 2006/0099965 A1 | 5/2006 | Aaron |
| 2007/0084913 A1 | 4/2007 | Weston |
| 2008/0208762 A1 | 8/2008 | Arthur et al. |
| 2009/0063312 A1 | 3/2009 | Hurst |
| 2009/0179753 A1 | 7/2009 | Bonner et al. |
| 2009/0240626 A1* | 9/2009 | Hasson ............. G06Q 20/10 705/75 |
| 2010/0276484 A1 | 11/2010 | Banerjee et al. |
| 2010/0332339 A1 | 12/2010 | Patel et al. |
| 2011/0145093 A1 | 6/2011 | Paradise et al. |
| 2011/0202425 A1 | 8/2011 | Hui et al. |
| 2011/0246316 A1 | 10/2011 | Cincera |
| 2011/0276496 A1 | 11/2011 | Neville et al. |
| 2012/0072353 A1* | 3/2012 | Boone ............. G06Q 20/10 705/64 |
| 2012/0173351 A1 | 7/2012 | Hanson et al. |
| 2012/0209749 A1 | 8/2012 | Hammad et al. |
| 2012/0271712 A1 | 10/2012 | Katzin et al. |
| 2013/0080289 A1 | 3/2013 | Roy et al. |

FOREIGN PATENT DOCUMENTS

| | | |
|---|---|---|
| JP | 2003050957 | 2/2003 |
| JP | 2003157403 | 5/2003 |
| JP | 2004021368 | 1/2004 |
| JP | 2004062643 | 2/2004 |
| JP | 2007058376 | 3/2007 |
| JP | 2011118563 | 6/2011 |
| WO | WO2010141656 | 12/2010 |

OTHER PUBLICATIONS

Translated Japanese Office Action mailed Jul. 7, 2015 for Japanese patent application No. 2014-545982, a counterpart foreign application of US patent application No. 13/313,912, 13 pages.

Final Office Action for U.S. Appl. No. 13/313,912 mailed on Jun. 17, 2015, Harsha Ramalingam, "Network-accessible Point-of-sale Device Instance", 13 pages.

Office Action for U.S. Appl. No. 13/313,912, mailed on Dec. 9, 2014, Harsha Ramalingam, "Network-accessible Point-of-sale Device Instance", 9 pages.

The Canadian Office Action mailed Dec. 15, 2015 for Canandian patent application No. 2858203, a counterpart foreign application of U.S. Appl. No. 13/313,912, 4 pages.

Office action for U.S. Appl. No. 13/313,912, mailed on Dec. 31, 2015, Ramalingam, "Network-accessible Point-of-sale Device Instance", 11 pages.

Office action for U.S. Appl. No. 13/313,912, mailed on Aug. 19, 2016, Ramalingam, "Network-accessible Point-of-sale Device Instance", 13 pages.

The Canadian Office Action mailed Oct. 27, 2016 for Canadian Patent Application No. 2858203, a counterpart foreign application of U.S. Appl. No. 13/313,912, 4 pages.

The Chinese Office Action mailed Jul. 18, 2016 for Chinese patent application No. 201280059933.7, a counterpart foreign application of U.S. Appl. No. 13/313,912.

The PCT Search Report mailed Feb. 15, 2013 for PCT application No. PCT/US12/67785, 9 pages.

\* cited by examiner

MERCHANT VERIFICATION OF IN-PERSON ELECTRONIC TRANSACTIONS

RELATED APPLICATIONS

This application is a continuation in part of U.S. application Ser. No. 13/313,912 filed on Dec. 7, 2011 which is incorporated by reference herein in its entirety.

BACKGROUND

Merchants may wish to receive electronic payments from customers without the expense and inconvenience of establishing the conventional infrastructure necessary to process electronic payments. This need may be particularly acute among small and medium-sized brick-and-mortar merchants. These types of merchants may wish to receive payments in forms other than cash or check, yet may also wish to avoid spending money to purchase a point-of-sale device for processing credit cards and other types of non-cash transactions.

An increasing number of customers have mobile computing devices with network connectivity—smart phones, tablet computers, and the like—with them while shopping at brick-and-mortar merchants. Some of these mobile devices may be used to make purchases over the Internet through a web browser or other interface. Thus, it may be possible for the brick-and-mortar merchants to establish websites that the customers may use to make "online" purchases while physically at the merchant's location.

However, since the mobile devices are under control of the consumers, it may be possible for unscrupulous individuals to create "mockup" or "fake" user interfaces designed to show that a payment was made to the merchant when in fact there was no payment. Thus, a merchant may be unable to obtain strong proof that he or she received an electronic payment unless the merchant establishes his or her own infrastructure such as a networked computer. This requirement for merchant-side infrastructure can impose additional costs on merchants and may increase friction during the transaction while the merchant goes to his or her computer to confirm that he or she has received a payment.

It would provide advantages to both merchants and customers if there was a way for customers to pay merchants using the customers' mobile devices and also give the merchant confidence he or she has actually received payment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
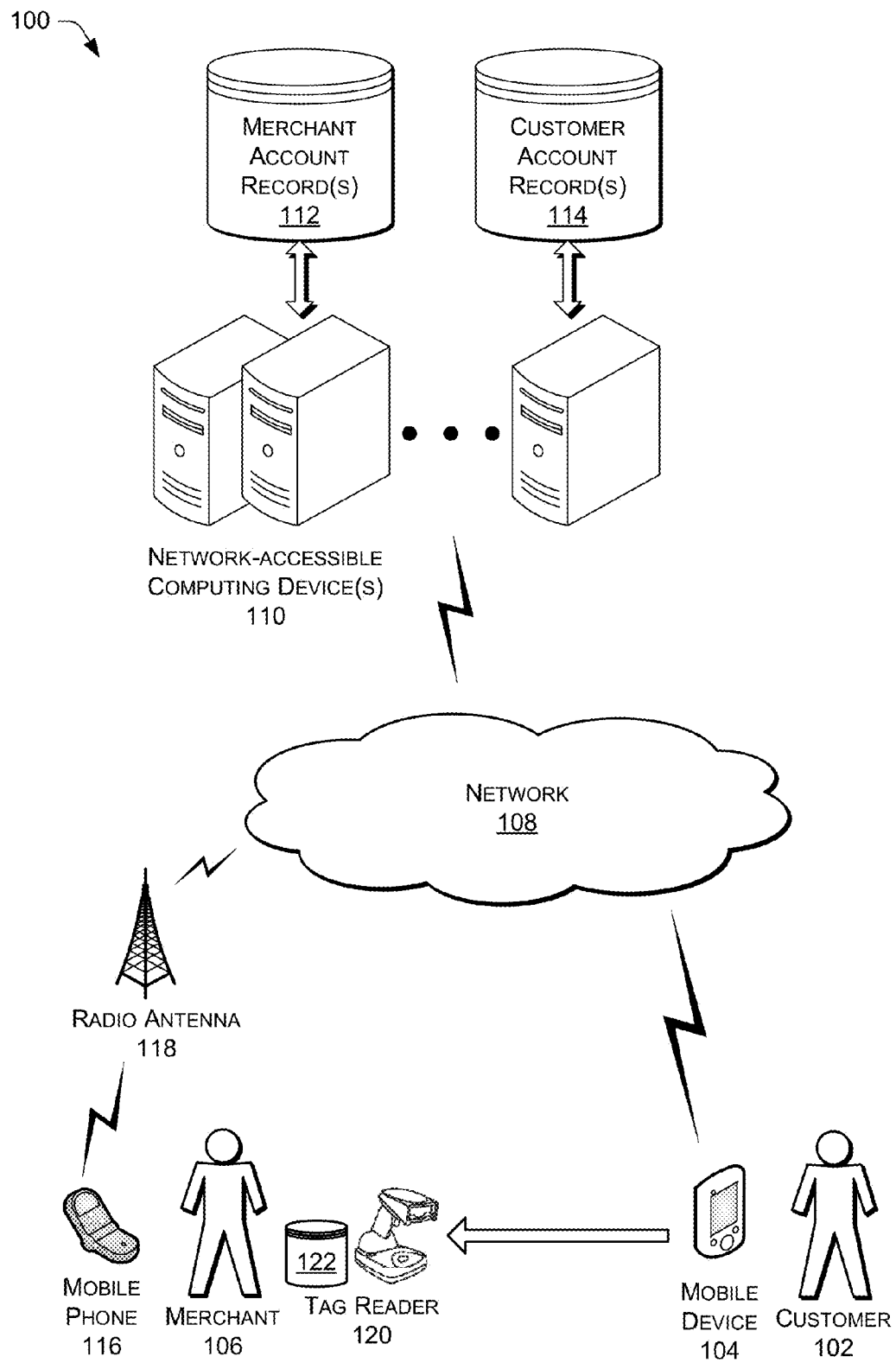
FIG. 1 shows an illustrative architecture for using a mobile device of a customer to complete a verified transaction with a merchant.

Validation provided by a backend server or other computer system allows merchants to verify that electronic payment made from a customer's mobile device is in fact a legitimate payment by providing "secret" verification information to the merchant. This secret information may be known or recognizable by the merchant. When this secret information is included on a receipt or confirmation message, this provides the merchant confidence that the receipt is not merely a "mockup" displayed on the customer's mobile device but does in fact represent a payment from the customer to the merchant. As used herein, "merchant" refers to a business that sells goods or services, a person working as an agent for that business such as an owner, employee, or contractor, or a physical location or building in which the business sells the goods or services. "Customer," as used herein refers to a person or other entity that purchases the goods or services sold by the merchant and is a user or owner of the mobile device. "Item" as used herein includes both goods and services of all types. Implementation of the techniques and devices used to provide the merchant confirmation for electronic payments made by a customer's mobile device may be understood in the context of the following illustrative and non-limiting example.

Jim, a customer, is having lunch at a small, local restaurant, a merchant. The owners of the restaurant have chosen not to spend money on payment infrastructure beyond a simple, non-networked cash register. However, out of a desire to provide their customers with greater payment options, the restaurant has established an account with an online service that will process electronic payments from mobile devices and provide verification to the restaurant. To establish this account the restaurant provided "secret" verification data. The owners of the restaurant used a photograph of their child as the verification data. They also provided an authentication challenge to identify themselves as the merchant to a customer's mobile device. The owners of the restaurant selected a four digit personal identification number (PIN) as their authentication challenge. In order to receive money from customers, the restaurant has linked their checking account to their account with the online service.

After he finishes his meal, Jim receives a bill from the restaurant. Here, the bill is a handwritten description of the foods Jim purchased and a total price. Jim launches a payment application on his smart phone and begins to type in the name of the restaurant. A list of merchants with similar names is displayed on the smart phone and Jim selects this restaurant from the list. The application on Jim's smart phone is communicating with the same on-line service with which the merchant has established an account. Thus, Jim's selection of the restaurant name from the list is provided to the on-line service and this allows the on-line service to associate the restaurant with this transaction.

Jim reads his bill and enters the charge from the bill, plus a tip, as the payment amount for this transaction. Jim has also previously created an account with the same online service, and Jim's account is linked to his credit card. The online service associates Jim with the transaction by his mobile device. Thus, the online service has now connected this transaction with a merchant, a customer, and a payment amount.

The online service facilitates a transfer of funds from Jim's credit card to the checking account of the restaurant using appropriate application programming interfaces (APIs) or other communication protocols. Once the online service receives confirmation that the payment amount was successfully deposited in the merchant's checking account, the online service sends a receipt including the payment amount and the picture of the restaurant owners' child to Jim's smart phone. Jim receives a payment confirmation message along with instructions to provide his smart phone to an employee of the restaurant.

One of the restaurant owners takes Jim's phone when they come to collect the bill and enters their PIN. The message from the online service has encrypted or otherwise concealed the picture of the child so that it is shown only when the correct PIN is entered. Thus, Jim cannot view of the "secret" verification data. The restaurant owner recognizes the picture of the child and sees that the payment amount is sufficient to cover the bill. Now the restaurant owner can feel assured that Jim has paid for his meal and not simply displayed a fake receipt on his smart phone. The restaurant owner selects a button on the smart phone to acknowledge that payment and delete the picture of the child from the smart phone. Therefore, even if Jim were able to later guess the pin or break the encryption, the verification data—the picture of the child—is no longer available on his smart phone. He must submit another payment in order to once again receive the picture of the child from the online service. The restaurant owner thanks Jim for his patronage and returns his phone.

At the end of the day the owners of the restaurant access their computer at home and review the electronic payments they have received from mobile devices of customers throughout the day. Both the owners and customers like Jim are pleased by the convenience with which they can make and receive electronic payments at the restaurant. To provide additional security, in case one of the customers may have somehow copied the image of the child and may try to use it in a fake receipt in the future, the owners of the restaurant change the verification data for tomorrow by uploading a picture of their dog to the online service and specifying that the dog's picture is now the verification data. It is difficult to remember multiple PINs, so the owners of the restaurant do not change the PIN tonight, but they do update their authentication challenge with the online service about once a month by selecting a different PIN.

Example implementations and context are provided with reference to the following figures, as described below in more detail. It is to be appreciated, however, that the following implementations and contexts illustrative of many possible implementations and contexts.

Illustrative Architecture, Devices, and Data Stores

FIG. 1 shows an illustrative architecture 100 in which a customer 102 employs a mobile device 104 to purchase in item from a merchant 106. The mobile device 104 may be implemented as any type of mobile computing device, including but not limited to a smart phone, a personal digital assistant (PDA), a laptop computer, a tablet computer, an eBook reader, a personal media player (PMP), a portable gaming system, and so forth.

The mobile device 104 may be connected to a network 108. The network 108 may include any one or combination of multiple different types of networks, such as cable networks, local area networks, personal area networks, wide area networks, the Internet, wireless networks, ad hoc networks, mesh networks, and/or the like. The mobile computing device 104 may access the network 108 through a wired or wireless connection such as a connection using radio signals (e.g., Wi-Fi, Bluetooth®, 3G network, 4G network, etc.).

One or more network-accessible computing devices 110 may also be connected to the network 108 and communicate with the mobile device 104 through the network 108. The network-accessible computing devices 110 may be server computers or other types of computing devices in a centralized or distributed architecture. Thus, the network-accessible computing devices 110 may represent "cloud-based" computing resources distributed across various machines and/or geographic locations. The network-accessible computing device(s) 110 may include or be communicatively connected to one or more data stores that include one or more merchant account records 112 and one or more customer account records 114. The merchant account record(s) 112 may include information provided by the merchant 106 to set up an account on the network-accessible computing device(s) 110 including information to provide verification that a transaction reported on the mobile device 104 represents an actual payment. The customer account record(s) 114 include information identifying the customer 102 and payment information for funding transactions with the merchant 106.

The merchant 106 may engage in transactions with the customer 102 without using any local devices other than the mobile device 104 of the customer 102. However, in some implementations, the merchant 106 may use a mobile phone 116 to receive information regarding transactions with the customer 102. The mobile phone 116 may use radio signals to communicate with a radio antenna 118 which in turn may provide connectivity via the network 108 to the network-accessible computing device(s) 110. Thus, the mobile phone 116 may be implemented as a "dumb" phone without direct connection to the Internet or any network other than a cellular phone network. The mobile phone 116 may receive text or short message service (SMS) messages from the network-accessible computing device(s) 110. The messages received by the mobile phone 116 may be used to provide confirmation of payments made by the mobile device 104 to the merchant 106, to provide PINS or codes for the merchant 106 to access "secret" information on the mobile device 104, or for other purposes.

The merchant 106 may also, in some implementations, use a tag reader 120 to read a tag presented by the mobile device 104. The tag reader 120 may be implemented as a scanner (e.g., reflective light, laser, etc.) that scans an image such as a bar code or QR code displayed on the mobile device 104. The tag reader 120 may be implemented in other ways such as a camera combined with machine vision software that receives and interprets images (e.g., including images more visually complex than bar or QR codes) displayed on the mobile device 104. Implementations of the tag reader 120 are not limited to receiving only visual information from the mobile device 104, but when implemented as, for example, a microphone the tag reader 120 may receive audio information, a "sound tag," from a speaker on the mobile device 104.

The tag reader 120 may indicate whether a tag presented by the mobile device 104 is valid or invalid. Valid tags may provide evidence that a payment from the customer 102 made using the mobile device 104 was received by the merchant 106. Invalid tags may indicate that the tag (e.g., image, sound, etc.) rendered by the mobile device 104 was not received from the network-accessible computing device(s) 110 in response to an actual payment, but was possibly "faked" by the customer 102 or that some other problem exists. The tag reader 120 may indicate the validity of a tag by illuminating a colored light and/or making a sound (e.g., green light for valid, red light for invalid; bell for valid, buzzer for invalid). The merchant 106 may then respond appropriately to the customer 102 based on the response from the tag reader 120.

The tag reader 120 may be a relatively simple device without a connection to the network 108. Thus, instructions for differentiating between valid and invalid tags that are stored in the tag reader 120 may be updated infrequently or not at all. Therefore, a tag which was valid once made be interpreted as valid every time that tag is presented to the tag reader 120.

To prevent reuse of a tag, the tag reader 120 may use its own local memory 122 to store transaction records. Preventing reuse of a tag may keep the customer 102 from receiving an item multiple times when the customer 102 has only paid once. Each tag may encode a transaction identifier that can be used to uniquely identify the transaction. The transaction identifier may be a number, an alphanumeric string, a hash code, or a similar value derived from any combination of the customer's 102 identity, an identifier of the mobile device 104, the merchant's 106 identity, the item that is the subject of the transaction, a time of the transaction, a payment amount for the transaction, or other data. When the tag is scanned, the transaction identifier may be stored in the memory 122. At the time of scanning, the transaction identifier may be made compared to other transaction identifiers in the memory 122, and if a match is found the tag reader 120 may indicate that the tag is invalid. Thus, the tag is interpreted as invalid because the tag is associated with a previously used transaction identifier. This is one technique for preventing the customer 102 from reusing a receipt to obtain additional items for free. The contents of the memory 122 may be periodically erased to create room for additional records. For example, the memory 122 may be erased when the instructions in the tag reader 120 for identifying a valid tag are updated.

In other implementations, the tag reader 120 may be a more sophisticated device that is connected to the network 108, and as such, the memory 122 may be network-accessible memory 122 and located somewhere in the "cloud" but not necessarily in physical proximity to the tag reader 120. Multiple tag readers 120 may also share the memory 122 to maintain a collective list of transaction identifiers by using a local network within a merchant 106 without necessarily having a connection to the network 108. With a collective memory 122 multiple tag readers 120, such as at a large merchant 106, may share the same list of used transaction identifiers thereby preventing a customer 102 from using a tag at one checkout location and then attempting to use the same tag again at a different checkout location.

Figure 2:
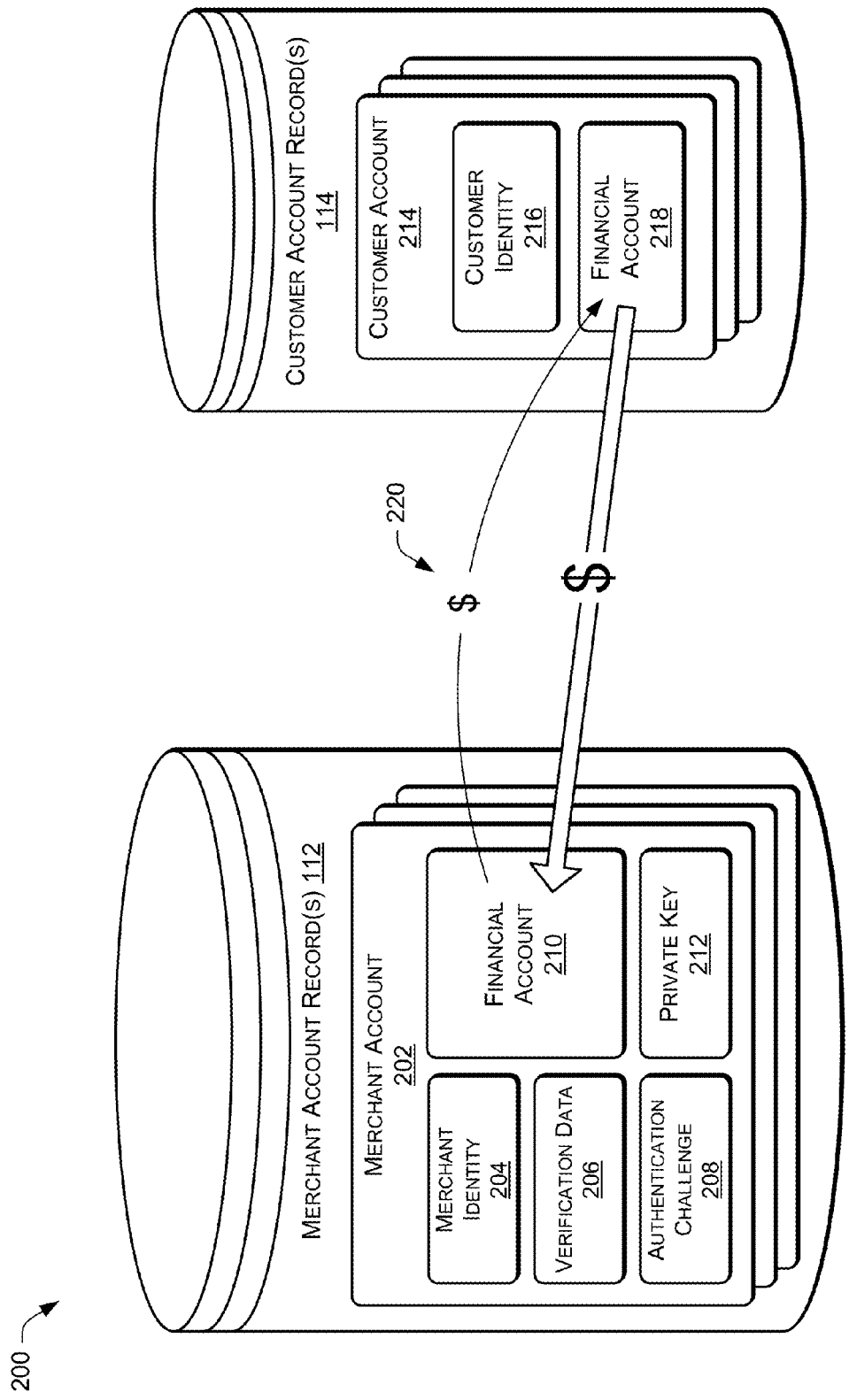
FIG. 2 shows the merchant account records and the customer account records from FIG. 1 in greater detail.

FIG. 2 shows a schematic representation 200 of the contents of the merchant account record(s) 112 and the customer account record(s) 114 in greater detail. The merchant account record(s) 112 may include accounts for multiple merchants including the merchant 106 shown in FIG. 1. The merchant 106 may provide various types of information to the network-accessible computing device(s) 110 when establishing a merchant account 202. Each merchant account 202 may include the merchant identity 204 represented as a name of the merchant 106, a unique identifier number or code of the merchant 106, an address of a merchant 106, a location of the merchant 106 on the surface of the earth (e.g., latitude and longitude), and any other information that can serve to identify the merchant 106.

The merchant account 202 may also include verification data 206 that is provided to the mobile device 104 so that merchant 106 is able to verify the authenticity of payment confirmation shown on the mobile device 104. Verification data 206 may be something the merchant has previously selected and possibly uploaded to the merchant account 202. For example, the verification data 206 may include text, a picture, a sound, a video, or a haptic response any of which may be rendered by the mobile device 104.

The verification data 206 may also include other types of data that the merchant 106 does not need to specifically provide or upload to the merchant account 202, but that may be easily recognizable by the merchant 106. For example, verification data 206 may also include recent purchase history of the merchant 106, a list of contacts of the merchant 106, or a social graph of connections of the merchant 106 in one or more social networks. As a further example, verification data 206 may be drawn from the pre-existing content in a social media account of the merchant 106 such as pictures of friends or contacts from the social media account. The network-accessible computing device(s) 110 may be associated with an on-line retailer and the merchant's account with the online retailer may provide a recent purchase history of the merchant 106 from the online retailer (e.g., most recent three purchases) as verification data 206. It is unlikely that the customer 102 would be able to "spoof" this information so using this information as verification data 206 provides the merchant 106 confidence that it did in fact come from the network-accessible computing device(s) 110.

Similarly, the network-accessible computing devices(s) 110 may have access to or be associated with an online address book, an instant messenger account, an e-mail account, or the like that includes a list of contacts of the merchant 106. The list of contacts or a subset of the list, for example the three most frequently contacted individuals, may be used as the verification data 206. Relationships derived from a social network in which the merchant 106 participates may be used to create a social graph of connections such as a graph of nodes and edges showing other entities near the merchant 106 in the merchant's social network. An image, or other representation, of the social graph may also serve as verification data 206. Any one or combination of the previous examples may be used as verification data 206.

The merchant account 202 may also include an authentication challenge 208 that may be required to be provided to the mobile device 104 before the mobile device 104 will render the verification data 206. The authentication challenge 208 may be a password that the merchant 106 provides to the mobile device 104 to authenticate the merchant 106 to the mobile device 104. The authentication challenge 208 may also be implemented as a personal identification number (PIN), a physical gesture (e.g., drawn on a touch-screen of the mobile device 104), a spoken phrase (e.g., recognized using voice recognition), or another biometric identifier such as a finger print, a facial image (e.g., using a camera on the mobile device 104), or the like.

The merchant 106 receives electronic payments from the customer 102 in a financial account 210 associated with the merchant 106. The merchant account 202 may include the financial account 210 as part of the merchant account 202 or may include the necessary information (e.g., passwords, communication protocols) to access a financial account of the merchant elsewhere such as at a bank. The financial account 210 associated with the merchant 106 represents the target or end point for payments from the customer 102 to the merchant 106.

As an additional or alternative form of security, the merchant account 202 may also include a private key 212. The private key 212 may be part of an asymmetric key pair. The public key may be stored on the mobile device 104 as part of the software used by the mobile device 104 to access the network-accessible computing device(s) 110. By using the private key 212 to sign data originating from the network-accessible computing device(s) 110 fraudulent data sent from other network-accessible computing devices can be identified and ignore because that fraudulent communication lacks the private key 212.

The customer 102 may also have his or her own customer account 214 stored with other customer account records 114. The customer account records 114 may include any number of customer accounts 214 for numerous individual customers such as the customer 102 shown in FIG. 1. The customer 102 may create his or her customer account 214 well in advance of initiating a transaction with the merchant 106 or while at the merchant 106.

The customer account 214 may include the customer identity 216 and one or more financial accounts 218. The customer identity 216 may be the customer's name or another unique identifier of the customer 102. In some implementations, the customer identity 216 may be tied to the mobile device 104 and the customer identity 216 may be based on a serial number or identifier of the mobile device 104. The financial account 218 associated with the customer 102 may include a financial account that is part of the customer account 214 or the financial account 218 associated with the customer 102 may include information such as passwords and communication protocols to access a financial account elsewhere. The customer account 214 may include information about multiple financial accounts 218 associated with the customer 102 such as multiple credit card accounts, checking accounts, savings accounts, and the like. The customer 102 may select one of these accounts as a default account to use when making electronic payments with his or her mobile device 104. The financial account 218 associated with the customer 102 provides the source of funds for payments to the financial account 210 associated with the merchant 106.

In some situations the merchant 106 may pay the customer 102 shown by the "reverse" transaction 220. Flow of funds from the merchant's financial account 210 to the customer's financial account 218 may also be implemented by using the mobile device 104. The reverse transaction 220 may represent a refund for a returned item, a credit applied for a coupon or other discount, a difference between an initial larger charge and the actual, lower amount due to the merchant 106, or the like. In order to prevent the customer 102 from being able to use his or her mobile device 104 to take money out of the merchant's financial account 210, the reverse transaction 220 functionality of the mobile device 104 may require a correct answer to the authentication challenge 208. For example, the merchant's PIN may be required in order to transfer money from the merchant's financial account 210 to the customer's financial account 218.

Figure 3:
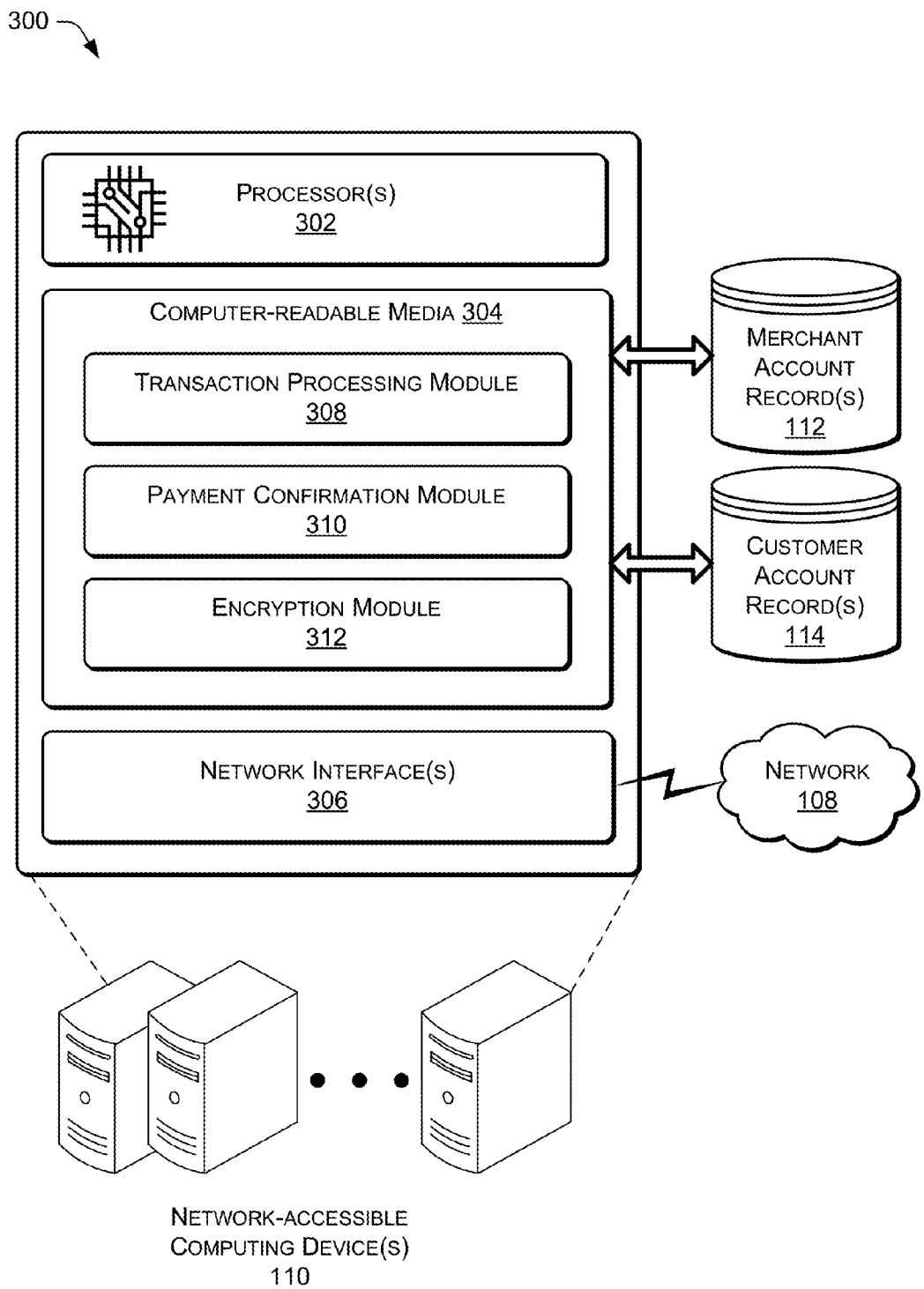
FIG. 3 shows the network-accessible computing device(s) from in FIG. 1 in greater detail.

FIG. 3 shows illustrative block diagram 300 of components in the one or more network-accessible computing devices 110 of FIG. 1. The network-accessible computing device(s) 110 comprises one or more processors 302 and one or more forms of computer-readable media 304. The computer-readable media 304 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory computer-readable medium which can be used to store information and which can be accessed by a processor. The network-accessible computing device(s) 110 also includes one or more network interfaces 306 for communicating with network 108. The network interfaces 306 may provide network connectivity through any wired or wireless technology such as a phone line, Ethernet, coaxial cable, Bluetooth®, Wi-Fi, or the like.

The computer-readable media 304 may contain one or more modules representing computer-executable instructions that may be executed on the one or more processors 302. One illustrative module is a transaction processing module 308. The transaction processing module 308 may receive a request from the mobile device 104 to transfer a payment amount from the financial account 218 associated with the customer 102 to the financial account 210 associated with the merchant 106. The transaction processing module 308 may instruct the financial account 218 associated with the customer 102 to transfer the payment amount indicated by the customer to the financial account 210 associated with the merchant 106. Once the payment has cleared into the financial account 210 associated with the merchant 106, the transaction processing module 308 may receive a confirmation.

A payment confirmation module 310 stored in the computer-readable media 304 may send the verification data 206 and the authentication challenge 208 from the merchant account record(s) 112 to the mobile device 104 upon receiving an indication that the merchant 106 received a payment from the customer 102. The indication may be the confirmation received by the transaction processing module 308. The verification data 206 is configured to remain concealed on the mobile device 104 until a valid response to the authentication challenge 208 is provided by the merchant 106 to the mobile device 104.

An encryption module 312 stored in the computer-readable media 304 may encrypt the verification data 206 so that a device (e.g., the tag reader 120) at the merchant 106 is able to decrypt the verification data 206 and the mobile device 104 is not able to decrypt the verification data 206. For example, an encrypted string of data may be represented as a barcode that is sent to the mobile device 104 and displayed for scanning by the tag reader 120. Reading the barcode may simply provide the encrypted string of data without decrypting the data. The tag reader 120 may include the necessary key to decrypt the data and check if it is valid or invalid.

The encryption module 312 may also function to encrypt the verification data 206 and/or the authentication challenge 208 with the private key 212. The encrypted data can then be decrypted by the corresponding public-key on the mobile device 104. Use of the private key 212 to sign outgoing data from the network-accessible computing device(s) 110 provides additional assurance that the communication received by the mobile device 104 is not a fraudulent message intended to mimic a message sent from the network-accessible computing device(s) 110.

Figure 4:
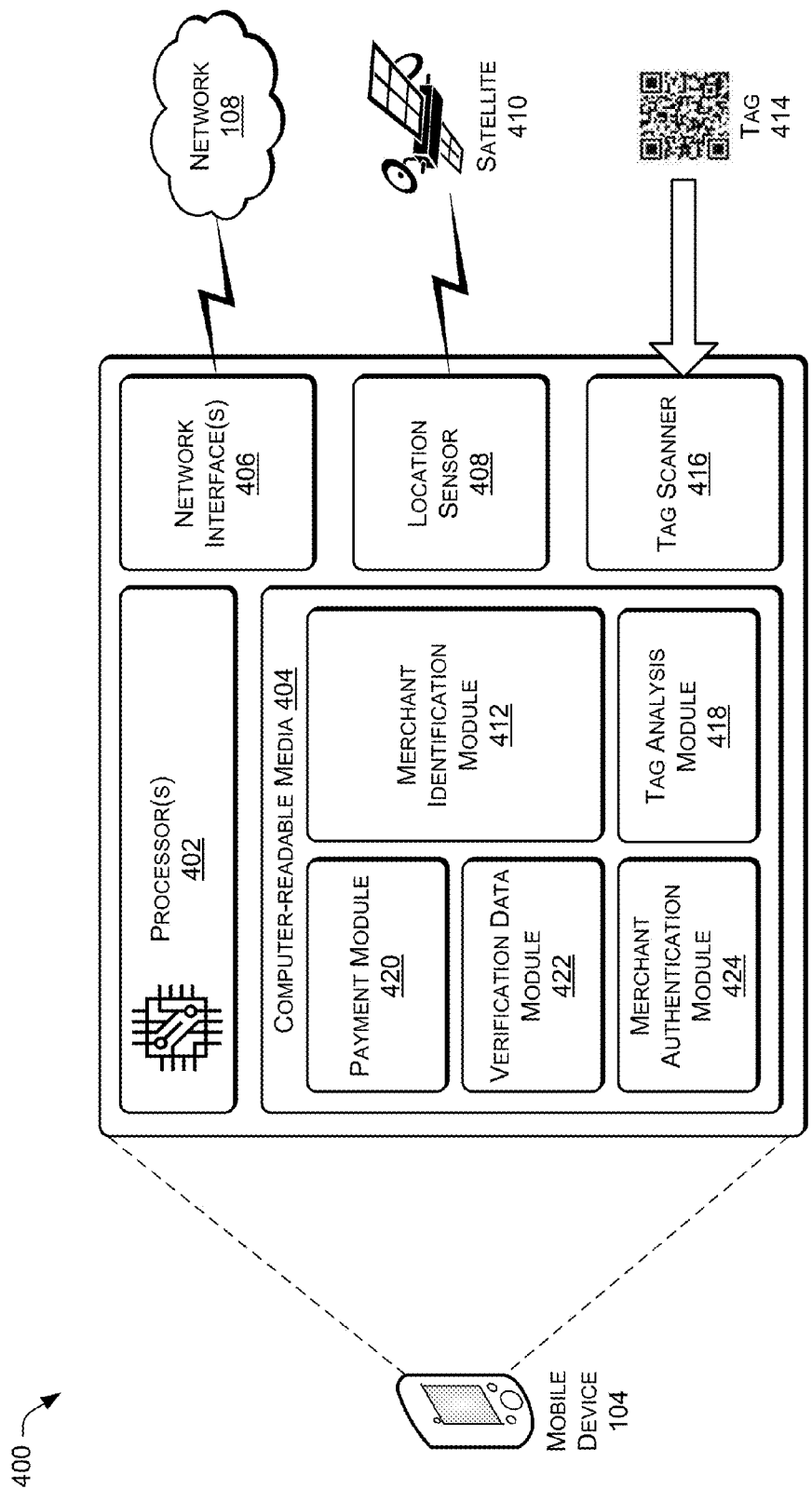
FIG. 4 shows the mobile device from FIG. 1 in greater detail.

FIG. 4 shows an illustrative block diagram 400 of components in the mobile device 104 of FIG. 1. The mobile device 104 comprises one or more processors 402 and one or more forms of computer-readable media 404. The mobile device 104 also includes one or more network interfaces 406 for communicating with the network 108. The network interfaces 406 may provide network connectivity through any wired or wireless technology such as a phone line, Ethernet, coaxial cable, Bluetooth®, Wi-Fi, or the like.

In some implementations, the mobile device 104 may have a location sensor 408 so that the mobile device 104 is location aware, or is able to provide information to another entity (e.g., the network-accessible computing device(s) 110) to allow the other entity to determine a location of the mobile device 104. A location on the surface of the earth, or a "geolocation," may be provided to the location sensor 408 by a satellite 410 such as a global positioning system (GPS) satellite. Alternatively, wireless signals such as from a radio antenna may be used to determine a geolocation of the mobile device 104 relative to a known position of the radio antenna or by triangulation. Other technologies and methods for determining geolocation are also envisioned within the scope of this disclosure such as, for example, calculating geolocation based on a network access point (e.g., Wi-Fi hotspot) or from a locator signal broadcast from a known location such as inside the merchant 106.

The computer-readable media 404 of the mobile device 104 may include one or more modules such as a merchant identification module 412 to receive information identifying the merchant 106. The customer 102 may input the identity of the merchant 106 into the mobile device 104. The merchant identification module 412 may receive this input and use it to identify the merchant 106. In some implementations, the merchant identification module 412 may compare the information provided by the customer 102 with merchant identity 204 information stored in the merchant account record(s) 112 to locate a match. The merchant identification module 412 may also use the geolocation of the mobile device 104 as determined by the location sensor 408 to identify the merchant 106 by comparing the geolocation of the mobile device 104 to a list or map of merchant locations. Geolocation may be combined with customer input to create a list of nearby merchants from which the customer 102 can select the correct merchant 106.

The merchant identification module 412 may also identify the merchant 106 by a tag 414 located at the merchant 106. The tag 414 may be a barcode, a QR code, a radio frequency identification (RFID) tag, or other type of tag that the merchant 106 can place at the merchant location (e.g., a QR code printed on a menu at a restaurant). The tag 414 may contain information identifying the merchant 106 such as the merchant's name or a unique identifier used to match the merchant 106 with a merchant identity 204 stored in one of the merchant accounts 202 in the merchant account record(s) 112. The tag 414 may be read by a tag scanner 416 in the mobile device 104. The tag scanner 416 may be implemented as a camera, a reflected light scanner, an antenna configured to receive signals from RFID tags, or the like. Data obtained by the tag scanner 416 may be processed by a tag analysis module 418 stored in the computer-readable media 404. The tag analysis module 418 may identify the merchant 106 based on the data obtained from the tag 414 scanned by the tag scanner 416 and provide the information identifying the merchant 106 to the merchant identification module 412.

A payment module 420 stored in the computer-readable media 404 may receive an indication of a payment amount and provide instructions to transfer the payment amount from an account associated with the mobile device 104 (e.g., the financial account 218 associated with the customer 102) to an account associated with the merchant 106 (e.g., the financial account 210 associated with the merchant 106). The indication of the payment amount may be provided by the customer 102 entering the payment amount into the mobile device 104. In some implementations the payment amount may be included in the tag 414 (e.g., printed on a bill) and provided to the payment module 420 by the tag analysis module 418.

A verification data module 422 stored in the computer-readable media 404 may receive the verification data 206 indicating that the account associated with the merchant 106 (e.g., financial account 210) has received the payment amount. To help keep the verification data 206 secret from the customer 102, the authentication challenge 208 associated with the verification data 206 may also be received by the verification data module 422.

A merchant authentication module 424 stored in the computer-readable media 404 may receive a response to the authentication challenge 208 and, after receiving a valid response, render the verification data 206. Thus, the merchant authentication module 424 may use the authentication challenge 208 to prevent the customer 102, or anyone else other than the merchant 106, from accessing the verification data 206. This decreases the likelihood that a party other than the merchant 106 can copy the verification data 206 to use in a fake receipt.

Illustrative User Interfaces

Figure 5:
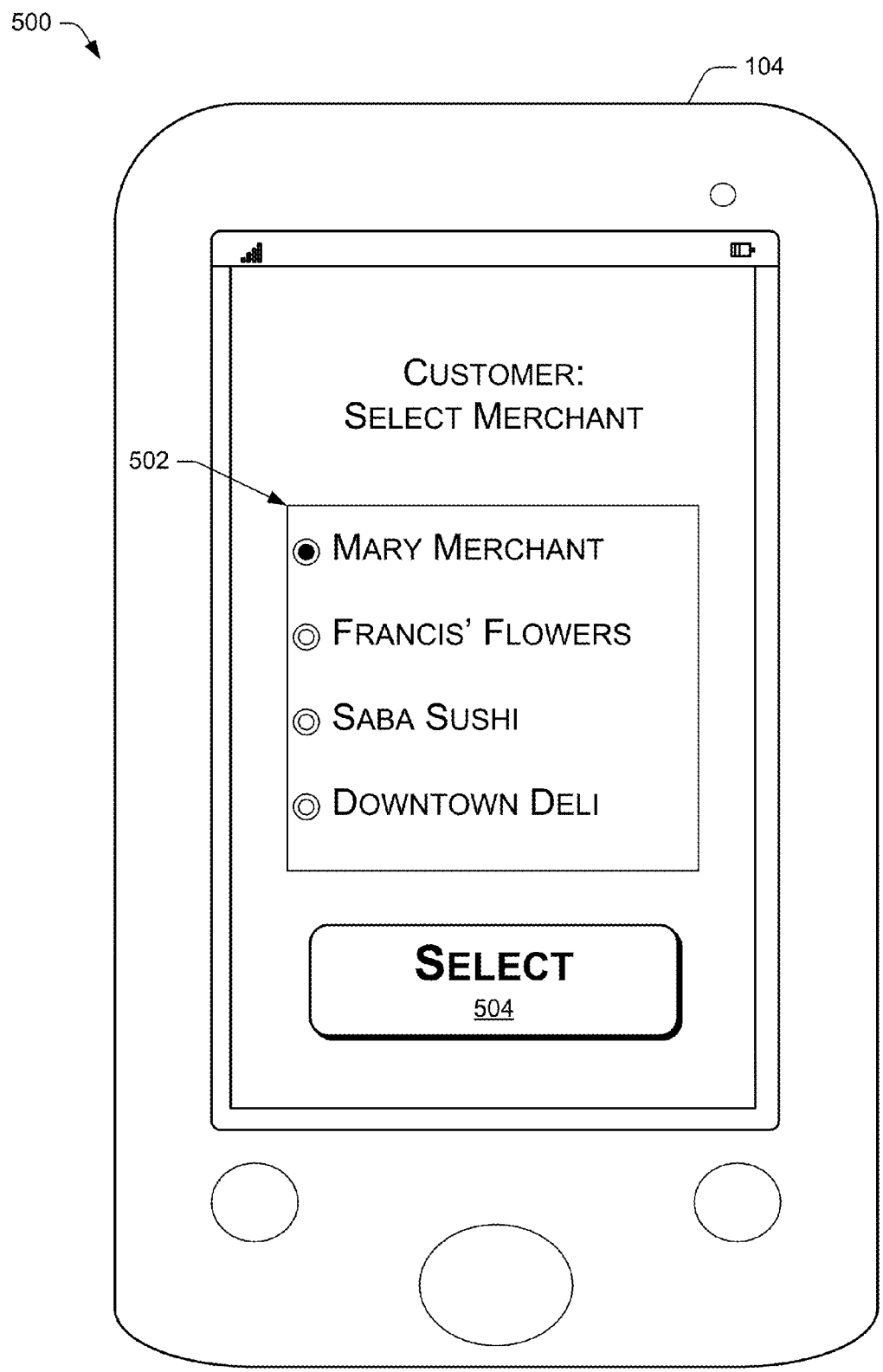
FIG. 5 shows an illustrative user interface on the mobile device for selecting a merchant.

FIG. 5 shows an illustrative user interface 500 of the mobile device 104 providing a list of merchants 502 to the customer 102. In this example, the customer 102 indicates that the merchant 106 he or she wishes to pay is "Mary Merchant." The list of merchants 502 may be populated based on the geolocation of the mobile device 104 with those merchants 106 that are closest to the current location of the mobile device 104. The list of merchants 502 may also be populated based on a merchant name or identifier entered by the customer 102. Once a customer 102 has identified and indicated the merchant 106 that he or she wishes to transact with, the customer 102 may suppress the "select" button 504 to select Mary Merchant as a recipient for an electronic payment.

Figure 6:
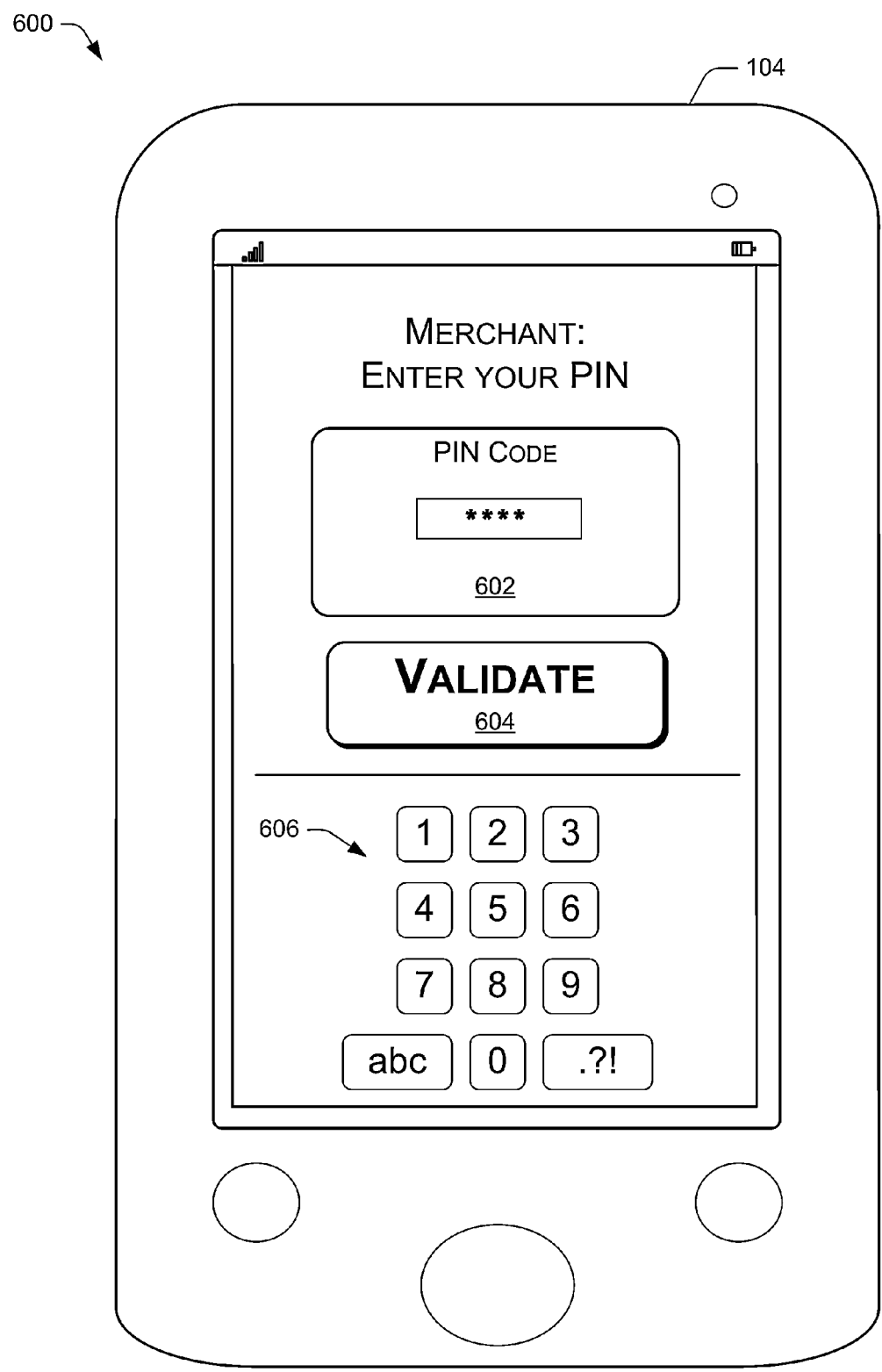
FIG. 6 shows an illustrative user interface on the mobile device for entering a PIN code.

FIG. 6 shows an illustrative user interface 600 of the mobile device 104 providing a field 602 for the merchant 106 to enter a PIN code. While the previous user interface 500 is intended for the customer 102 to enter information into the mobile device 104, this user interface 600 is intended for the merchant 106 to enter information into the mobile device 104. Entering the PIN code is one example of the authentication challenge 208. The user interface 600 or a similar user interface may be presented to receive other types of authentication challenge 208 such as the merchant 106 drawing a symbol with his or her finger on a touch screen of the mobile device 104. The merchant 106 may submit the PIN code for validation (e.g., by the transaction processing module 210) by pressing the "validate" button 604. The user interface 600 may also include a numeric keypad 606 for the merchant 106 to enter the PIN. In implementations in which the authentication challenge 208 is something other than a PIN, the user interface 600 may present appropriate input elements instead of the numeric keypad 606. For example, if the authentication challenge 208 is a spoken phrase, the user interface 600 may display a "record" button for the merchant 106 to press before speaking the phrase into the microphone of the mobile device 104. Entry of a valid response to the authentication challenge 208 causes the mobile device 104, for example the merchant authentication module 418, to display the verification data 206.

Figure 7:
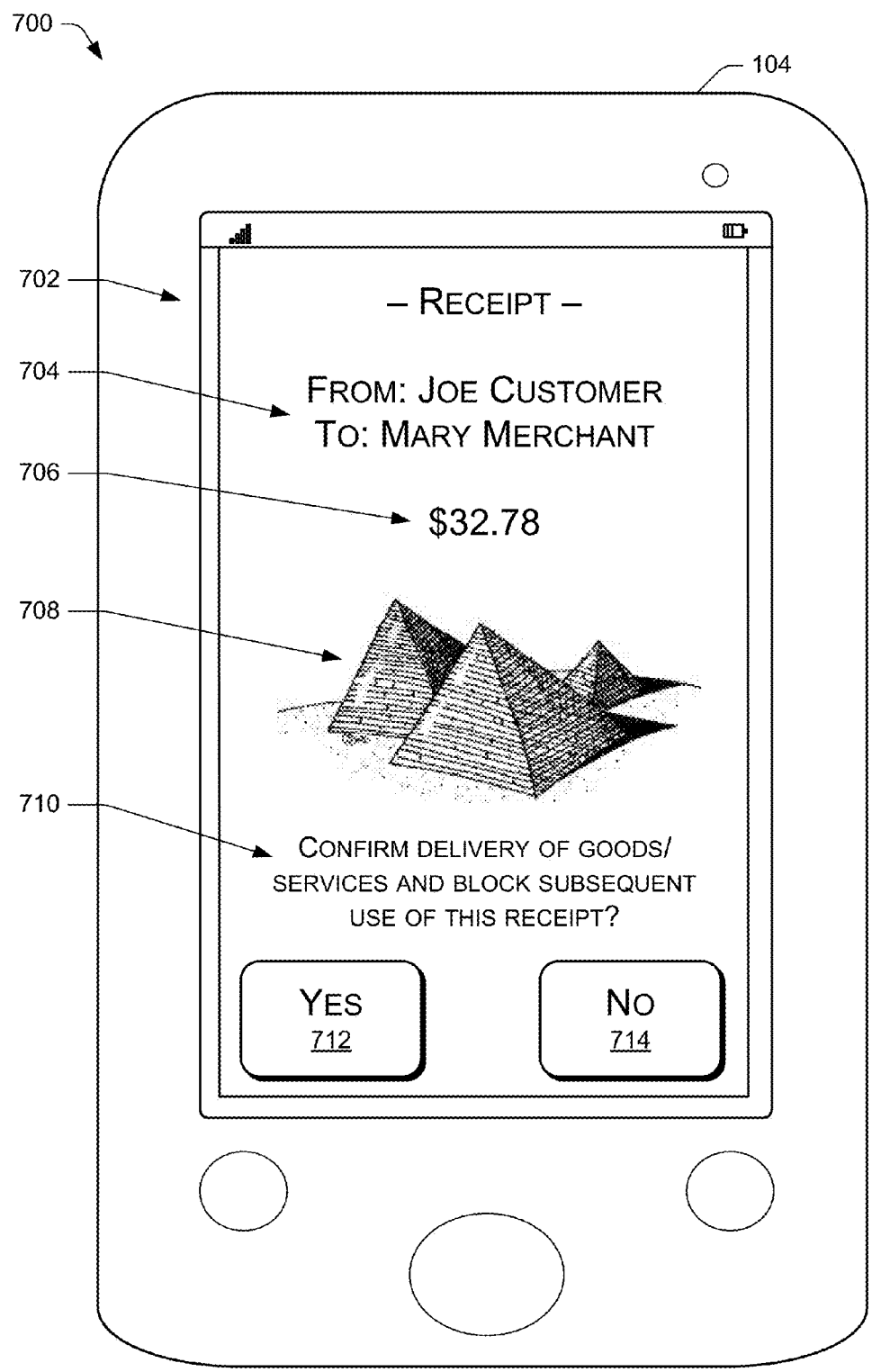
FIG. 7 shows an illustrative user interface on the mobile device displaying a receipt that includes validation data.

FIG. 7 shows an illustrative user interface 700 on the mobile device 104 displaying a receipt 702. The receipt 702 displayed on the user interface 700 may include the name of the customer making the payment and the merchant receiving the payment 704. The receipt 702 may also include a date, a time, and any other information found on a conventional printed receipt. The receipt 702 shows the payment amount 706 received by the financial account 210 associated with the merchant 106. The receipt 702 also shows the verification data 206 illustrated here by a picture of pyramids 708. The picture of pyramids 708 may have been obtained from the verification data 206 of the merchant account 202. Since this image 708 may be something selected previously by the merchant 106, when it is rendered by the mobile device 104 of the customer 102, this provides the merchant 106 assurance that other information in the receipt 702 such as the payment amount 706 was in fact supplied by the network-accessible computing device(s) 110 and not merely an image displayed on the screening of the customer's 102 mobile device 104.

In some implementations, the user interface 700 may allow the merchant 106 to indicate that the item was provided to the customer 102 and to delete the picture of pyramids 708 from the mobile device 104 or otherwise block the mobile device 104 from showing the picture of pyramids 708 a second time. The user interface 700 may provide a query 710 to the merchant 106. In response to the query 710, the merchant 106 select a "yes" 712 button if the item was already provided to the customer 102 or select a "no" 714 button if the item has not yet been provided to the customer 106. Example, confirmation that the item was provided and a command to block subsequent presentation of the verification data 206, the pyramids 708, may be provided as a single input from the merchant 106 specifically pressing the "yes" 712 button. In other implementations, there may be separate inputs or user interface elements for the merchant 106 to acknowledge that the item was provided to the customer and to delete or block subsequent presentation of the verification data 206. Upon pressing "yes" 712 button, the user interface 700 may cease to show the receipt 702 and the merchant 106 may return the mobile device 104 to the customer 102. In other implementations, pressing the "yes" 712 button may remove the picture of the pyramids 708 but leave the remainder of the receipt 702 displayed on the mobile device 104. Thus, the customer 102 may receive a version of the receipt 702 that does not include the verification data 206.

Figure 8:
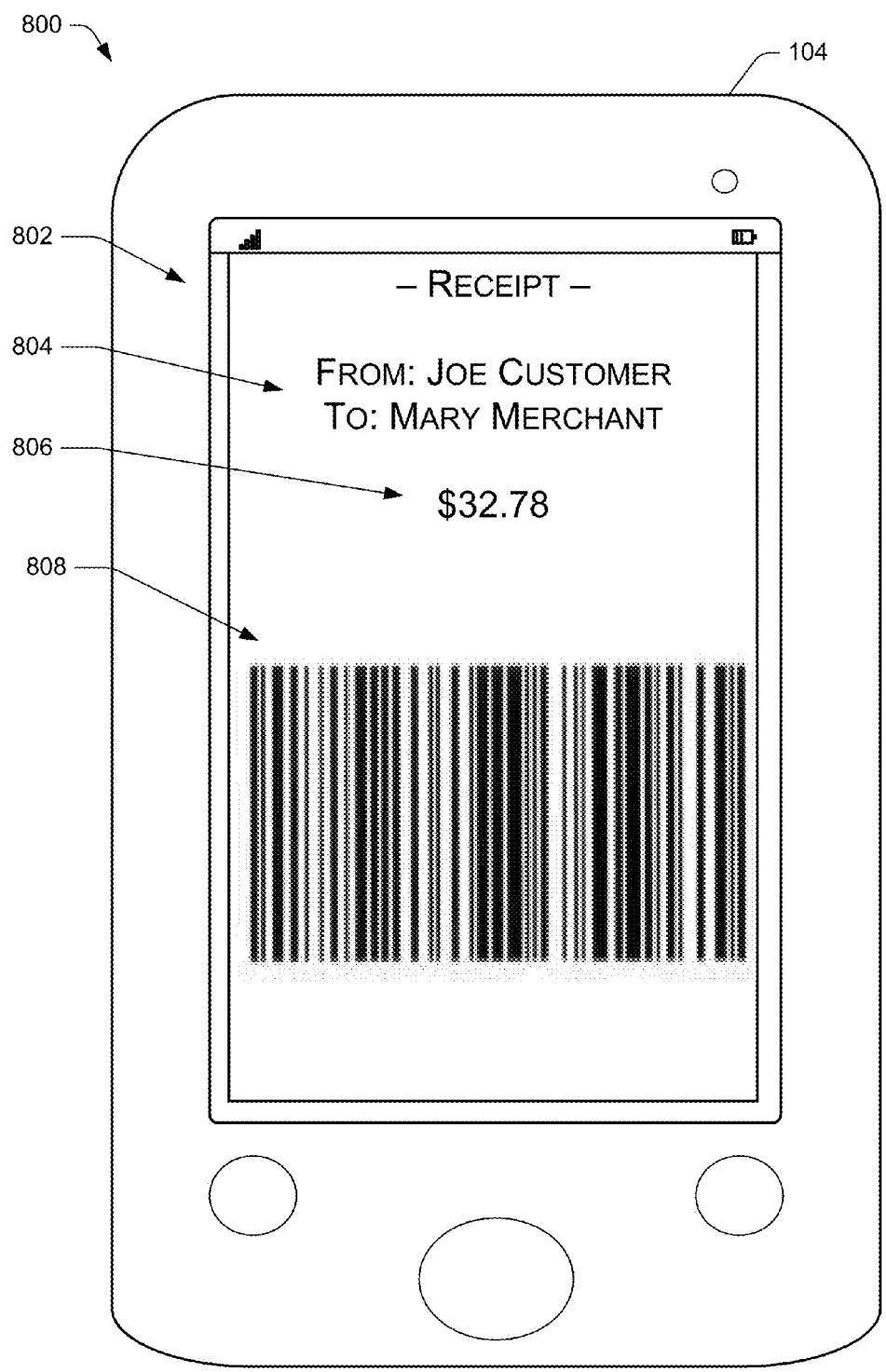
FIG. 8 shows an illustrative user interface on the mobile device displaying a receipt that includes machine-readable validation data.

FIG. 8 shows an illustrative user interface 800 on the mobile device 104 displaying the receipt 802 that similar to the receipt displayed in FIG. 7 includes an indication of the customer making the payment and the merchant receiving the payment 804, the payment amount 806 received by the financial account 210, associated with the merchant 106 and verification data 206. However, in this user interface 800 the verification data 206 is machine-readable data shown here as a barcode 808. Other types of machine-readable data may include QR codes and audio information.

The barcode 808 may be read by the tag reader 120 shown in FIG. 1. In this implementation, the customer 102 may simply hold his or her mobile device 104 in front of the tag reader 120. The red or green light (or other signaling mechanism) on the tag reader 120 informs the merchant 106 if the barcode 808 is valid verification data 206 or not. The barcode 808 may be a combination of the verification data 206 provided from the merchant account 302 and a transaction identifier for the specific transaction. The transaction identifier may be stored in memory 122 associated with the tag reader 120 so that subsequent use of the same transaction identifier is recognized by the tag reader 120 as being invalid even when the verification data 206 would otherwise be interpreted by the tag reader 120 as valid. Thus, when a revocation list or similar record of previously used transaction identifiers is maintained in a memory 122 associated with the tag reader 120, the merchant 106 may be able to prevent unauthorized reuse of a receipt 802 including verification data 206 without necessarily keeping the verification data 206 secret from the customer 102. In other words, in some implementations using machine-readable data such as the barcode 808, it may be possible for the merchant 106 to safely omit entering the PIN code as shown in FIG. 6. The memory 122 associated with the tag reader 120 may be cleared periodically (e.g., nightly) to make room for a new revocation list or may be cleared by the merchant 106 pressing a button on the tag reader 120 or otherwise instructing the memory 122 or the tag reader 120 erase all or part of the memory 122.

Figure 9:
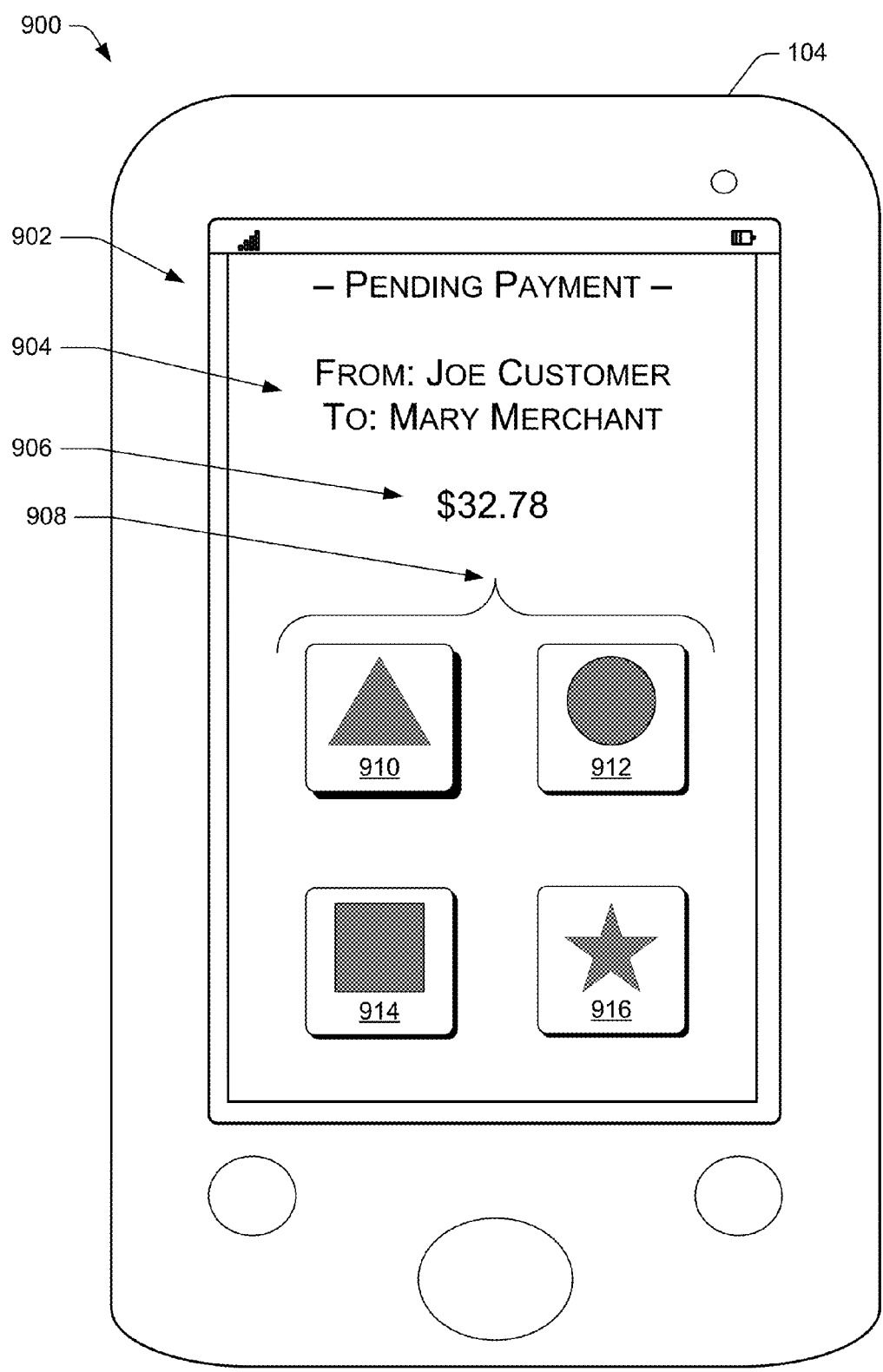
FIG. 9 shows an illustrative user interface on the mobile device displaying a pending payment and validation tags.

FIG. 9 shows an illustrative user interface 900 on the mobile device 104 displaying a pending payment 902. Pending payment 902 includes an indication of the customer making the payment and the merchant receiving the payment 904. The pending payment 902 also includes an indication of the payment amount 906 received by the financial account 210, associated with the merchant 106. The pending payment 902 may also include verification tags 908. The verification tags 908 may be images, symbols, text, pictures, or the like previously selected by the merchant 106 and associated with verification data 206. Here, four verification tags 908 are shown as a triangle 910, a circle 912, a square 914, and a star 916. However, there may be greater or lesser number of verification tags 908 included in the user interface 900 and the each verification tag 910-916 may show something other than a geometric shape. Each of the verification tags 910-916 may correspond to a different piece of verification data 206. The selection of which verification tags 908 are included in the user interface 900 may be random. The selection, random or otherwise, may be made by the network-accessible computing device(s) 110.

The merchant 106 may select one of the verification tags 910-916 by touching the corresponding image on the display of the mobile device 104. However, the customer 102 may wish to complete the transaction without handing his or her mobile device 104 to the merchant 106. The use of verification tags 908 allows the customer 102 to simply ask the merchant 106 which tag he or she would like to select. The customer 102 may then implement the merchant selection without giving the mobile device 104 to the merchant 106.

Figure 10:
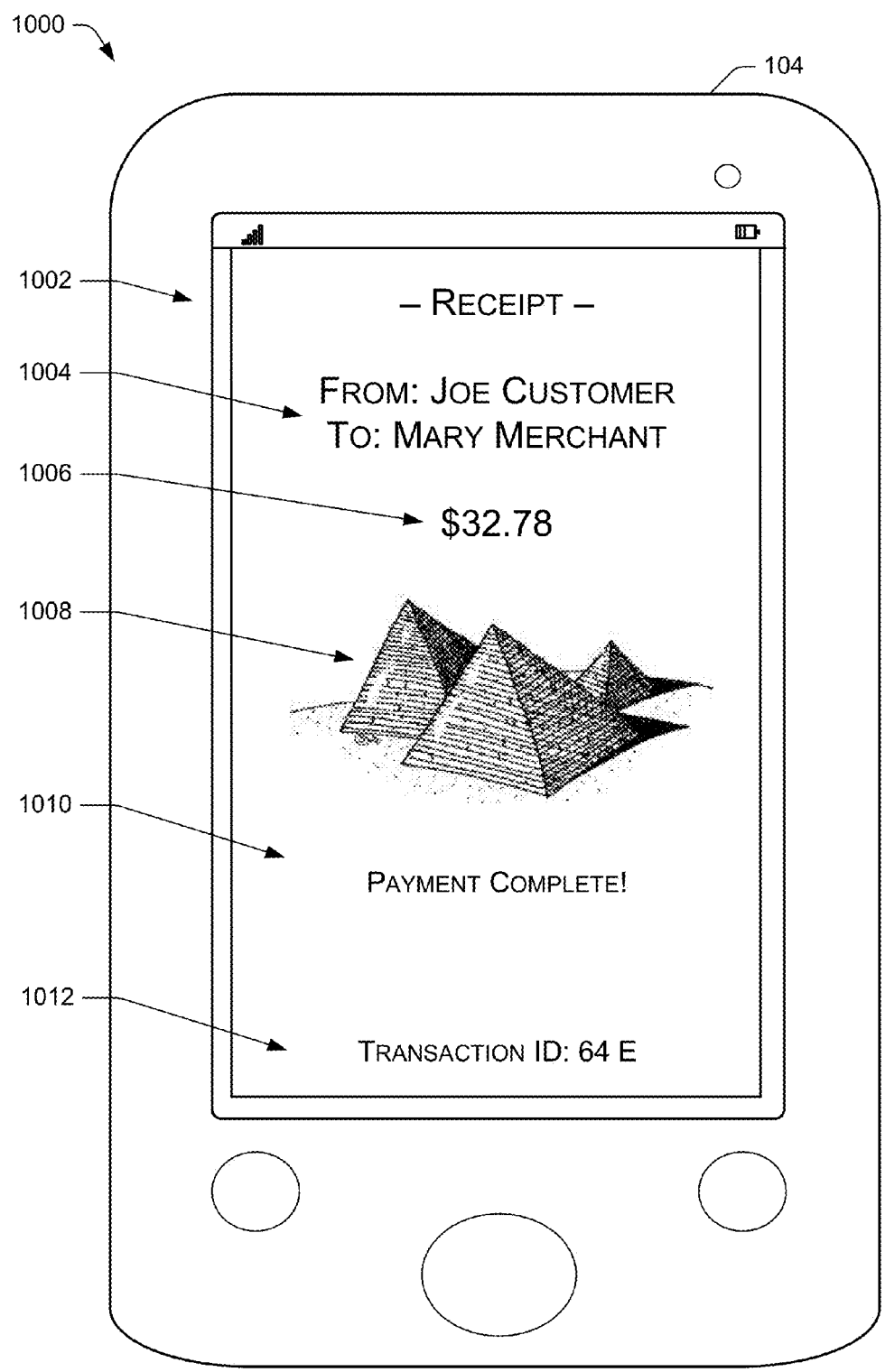
FIG. 10 shows an illustrative user interface on the mobile device displaying a receipt that includes validation data.

FIG. 10 shows an illustrative user interface 1000 on the mobile device 104 displaying a receipt 1002 following selection of one of the verification tags 908 shown in FIG. 9. In this example, the verification tag 910 with the triangle symbol was selected. The receipt 1002 may again include an indication of the customer making the payment and the merchant receiving the payment 1004 and the payment amount 1006. This user interface 1000 additionally shows verification data 206 represented here as an image of pyramids 1008. The merchant 106 may have previously associated the triangle verification tag 908 with this image of pyramids 1008. The merchant 106 may also associate different images with each of the other verification tags 912-916. The merchant 106 may select the correspondence between the triangle verification tag 910 and the image of the pyramids 1008 because of the similarity in shape. However, the merchant 106 is free to make create any correlation between a verification tag 908 and an image or other type of verification data 206.

The task of making these associations may be implemented automatically for the merchant 106 by using data in or available to the merchant account 202. For example, if the merchant account 202 is associated with a social networking account of the merchant 106, information from the social networking account may be used to create verification tag 908 and verification data 206 pairs. In one implementation, the names of people in the social network of the merchant 106 may be used as the verification tags 908, and when selected in the user interface 900, the picture corresponding to that person may appear as the verification data 206 in place of the pyramid image 1008. Presumably, the merchant 106 can reliably match his or her friends' faces with their names, so this choice of verification tags 908 and verification data 206 provides a confirmation that is easy for the merchant 106 to verify but may be difficult for others to fake. Other types of tag-data pairs presenting correlations that are recognizable to the merchant 106 are also possible.

Given that it may be very unlikely the customer 102 could have guessed which image (or other type of verification data 206) the merchant 106 chose to associate with the triangle verification tag 910, display of the pyramids 1008 provides the merchant 106 confidence that the payment amount 1006 was in fact deposited in his or her financial account 210. This is because, the network-accessible computing devices 110, for example the payment confirmation module 310, may be configured to send the pyramid image 1008 only after the payment amount 1006 is successfully received by the merchant 1006.

However, it may be possible for one or more malicious individuals to collect data on the verification tag 908 and corresponding verification data 206 from multiple interactions with the merchant 106. This may be used to create a mockup user interface designed to fool the merchant into thinking a payment was made when in fact it was not. The likelihood of this tactic being successful may be decreased by having a large pool of verification tags 908 and verification data 206. Random or round-robin selection of verification tags 908 may make it unlikely that the merchant 106 will be presented with the same verification tag 908. Thus, if the same one or several verification tags 908 are frequently displayed on the user interface 900, the merchant 106 may use that to recognize fraudulent behavior.

This receipt 1002 may also include an indication 1010 that the payment is completed. This indication 1010 may assist the merchant 106 and the customer 102 in knowing that it is appropriate to continue the transaction by, for example, delivering the item to the customer 102. The receipt 1002 may also include a transaction identifier 1012.

The transaction identifier 1012 assigned to a transaction may increment according to a defined sequence. For example, the transaction identifiers 1012 may start at 1 and increase numerically or start with the letter "A" and increment alphabetically. In addition to the incremented segment, the transaction identifier 1012 may also include a check "digit" or other type of indication that the merchant may use as additional confirmation that the transaction identifier 1012 is genuine. Here the transaction identifier 1012 is "64 E." The numeric portion may represent that this is the $64^{th}$ transaction in a given time period (e.g., one-day) and the letter "E" may function as the check digit. For example, transaction identifiers 1012 may be generated such that even numbered transactions are accompanied by a vowel (e.g., 64 and E) while odd numbered transactions are accompanied by a consonant (e.g., 65 and B). This provides the merchant 106 at least two ways to detect fraud. Specifically, if the merchant 106 sees a transaction identifier 1012 that is out of order (e.g., 7 follows 64 or 64 is followed by 105) that may suggest a "fake" receipt 1002. Also, if the check digit does not match the formula for generating check digits (e.g., an even number is followed by a consonant) that can also suggest a "fake" receipt 1002.

The transaction identifier 1012 may also be recorded separately by the merchant 106 (e.g., with pencil and paper) to use for later verification of the transaction. The merchant 106 may access his merchant account 202 from a desktop computer at a later time and use the transaction identifier 1012 to confirm that the payment for this transaction was placed in his or her financial account 210 as, for example, part of settling the transactions and payments for a day.

Illustrative Processes

The processes discussed below are illustrated as a collection of blocks in a logical flow graph, which represents a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 11:
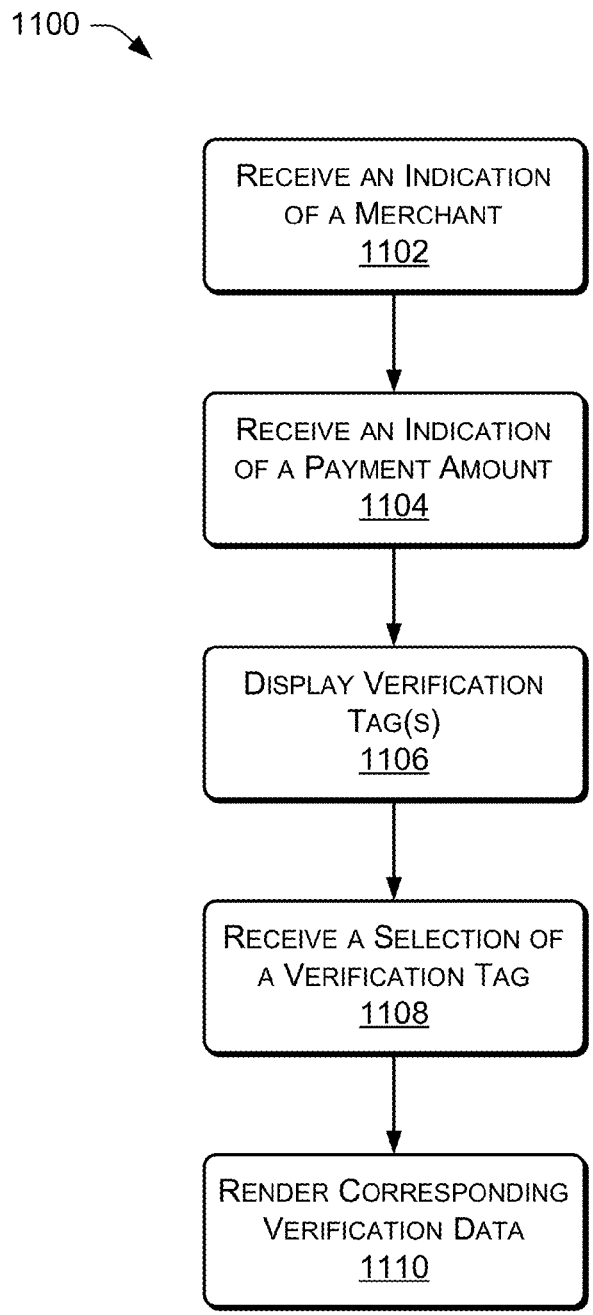
FIG. 11 is a flow diagram of an illustrative process for using verification tags and corresponding verification data for a merchant to verify payment made from a mobile device of a customer.

FIG. 11 shows an illustrative process 1100 for using verification tags 908 and corresponding verification data 206 to provide the merchant 106 assurance that an electronic payment made from a customer's mobile device 104 is a legitimate payment.

At 1102, an indication of the merchant 106 is received. The indication may received by the customer 104 entering the name of the merchant 106 into the mobile device 104, selecting the name of the merchant 106 from a list displayed on the mobile device 104, selecting the merchant 106 from a map, or the like. In some implementations, the indication of the merchant 106 may be received wholly or partially in an automated fashion such as based on comparison of a geolocation of the mobile device 104 to a location of the merchant 106, based on scanning a tag such as a barcode or QR tag present at the merchant 106 that provides identity of the merchant to the mobile device 104, obtaining the name of the merchant 106 from a wireless network connection (e.g., WiFi hotspot), or the like.

At 1104, an indication of a payment amount to be made from the customer 104 to the merchant 106 is received. The indication may provided by the customer 102 entering a payment amount via an input mechanism of the mobile device 104. The indication may also be provided by the tag scanner 416 of the mobile device 104 scanning a tag that provides the payment amount (e.g., a QR code printed on a paper bill).

At 1106, verification tags 908 such as the tags 910-916 shown in FIG. 9 may be displayed on the mobile device 104. Prior to displaying the verification tags 908, the mobile device 14 may obtain the verification tags 908 from the merchant account 202. In some implementations, the customer 102 may show the mobile device 104 to the merchant 106 and asked the merchant 106 which verification tag 908 to select. Alternatively, the customer 102 may simply describe the verification tags 908 to the merchant 106 without showing the verification tags 908, or even the mobile device 104, to the merchant 106.

At 1108, a selection of one of the verification tags 908 displayed in 1106 is received. The selection may be made by the customer 102 pressing (or otherwise selecting) one of the verification tags 908 based on instructions provided by the merchant 106.

At 1110, verification data 206 corresponding to the verification tag 908 selected at 1108 is rendered by the mobile device 104. When the merchant 106 is able to observe the verification data 206 that he or she expects to be correlated with the verification tag 908, the merchant 106 receives confirmation that the payment submitted by the mobile device 104 was in fact received in the merchant's financial account 210. The verification data 206 may be visual data, audio data, or another type of data so the rendering provided at 1110 may include displaying visual data on a screen, playing audio data from a speaker, or otherwise rendering the verification data 206 in a format appropriate for the merchant 106 to recognize and consume the verification data 206.

Figure 12A:
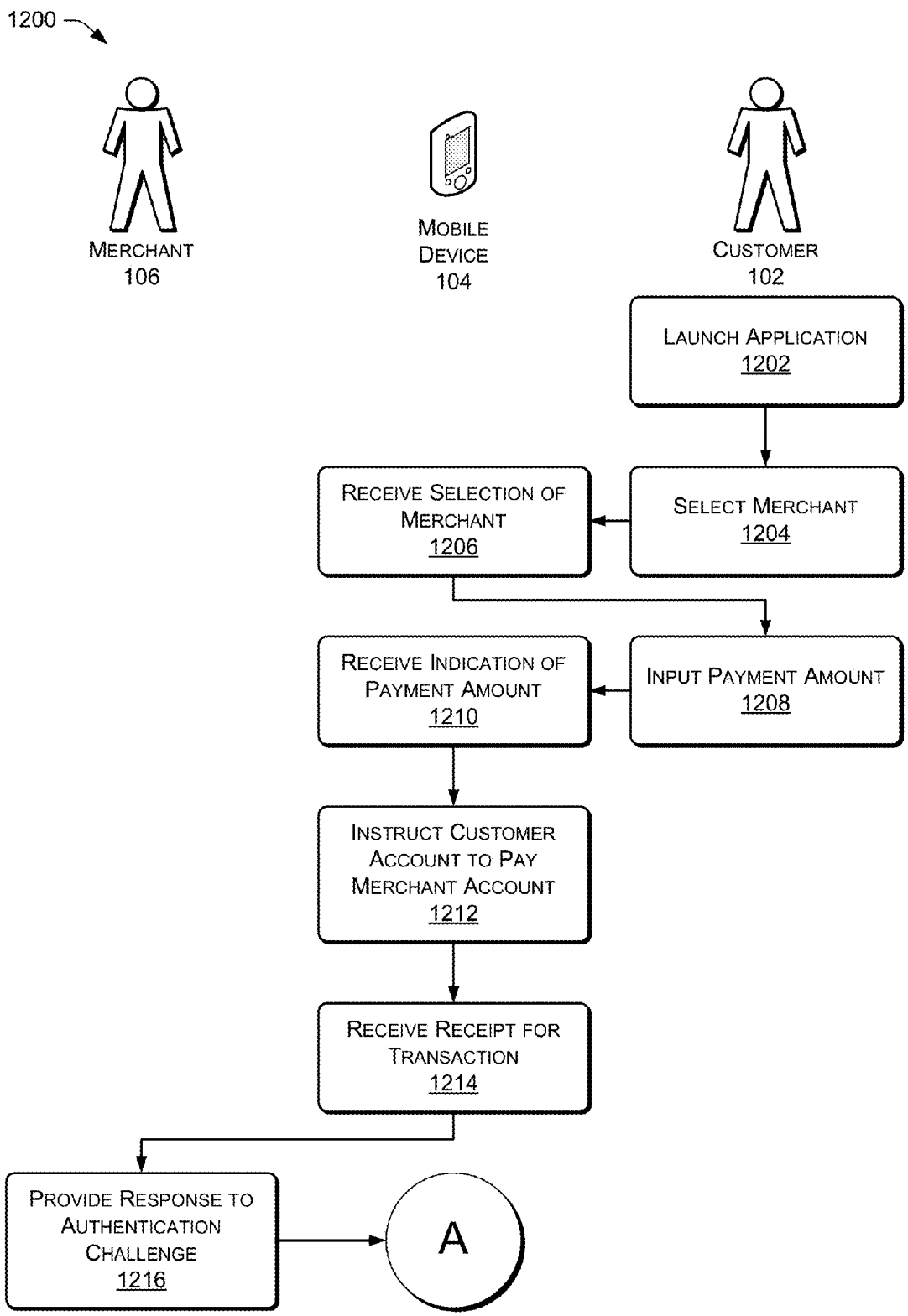
FIGS. 12a and 12b are a flow diagram of an illustrative process for using a mobile device of a customer to present verification data to a merchant for a transaction between the customer and the merchant.
Figure 12B:
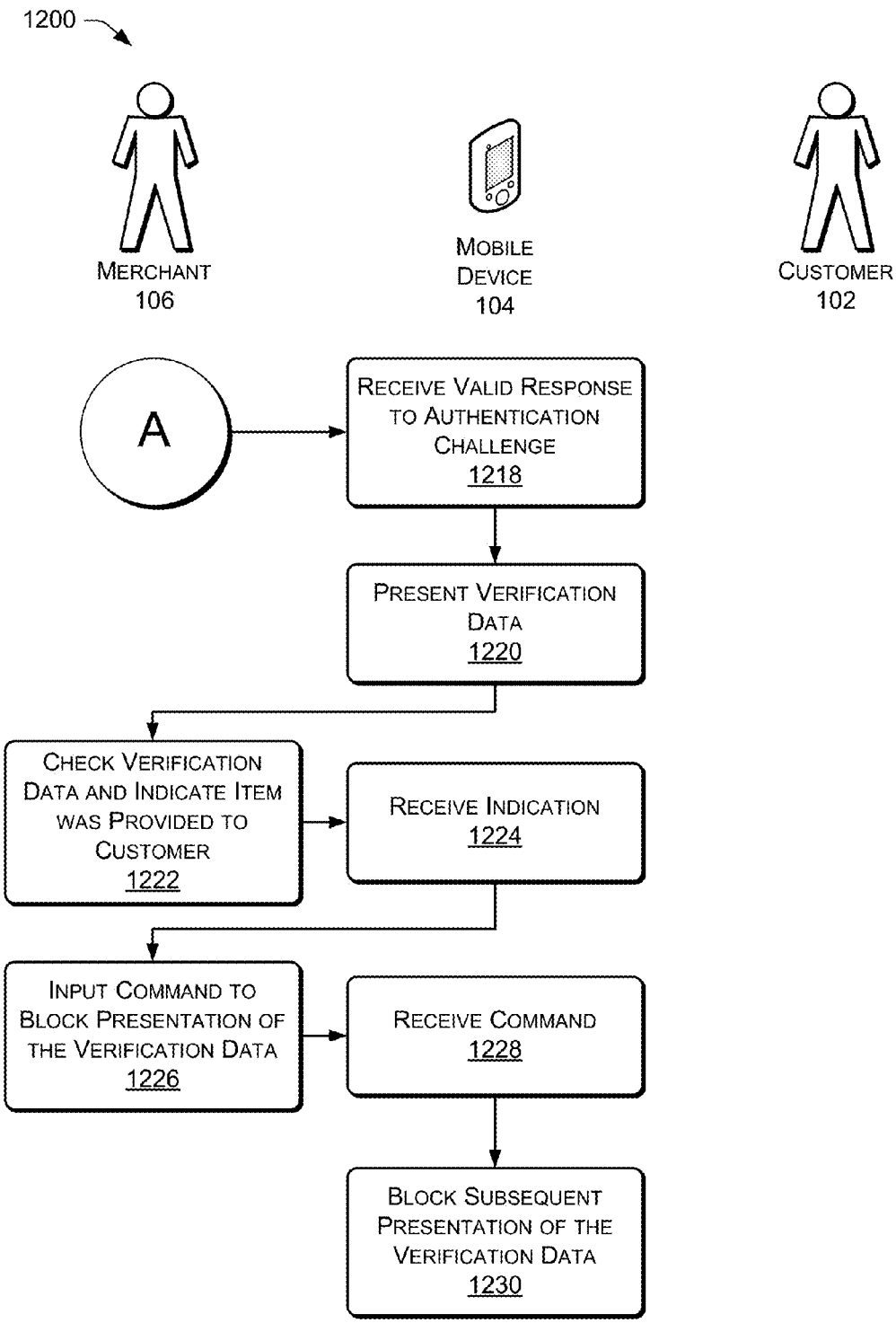

FIGS. 12a and 12b show an illustrative process 1200 for using the mobile device 104 of the customer 102 to make a verifiable electronic payment from the customer 102 to the merchant 106. At 1202, the customer 102 launches a payment application on his or her mobile device 104. The payment application may establish a connection between the mobile device 104 and the network-accessible computing device(s) 110. The payment application may also log the customer 102 into his or her customer account 214.

At 1204, the customer 102 selects the merchant 106. The customer 102 may select the merchant 106 from a list of one or more merchants presented to the customer 102 on the mobile device 104. The selection may be implemented using a user interface similar to that shown in FIG. 5. The customer 106 may also select the merchant 106 from a map that displays one or more merchants 106 in their respective locations on the map and may also display the location of the mobile device 104. The customer 102 input may be used to unambiguously identify the correct merchant 106 to receive the electronic payment.

At 1206, the mobile device 104 receives the selection of the merchant 106 based on the input provided by the customer 102 at 1204.

At 1208, the customer 102 indicates an amount he or she wishes to pay the merchant 106 for an item provided by the merchant 106. The customer 102 may indicate the payment amount before receiving an item (e.g., when purchasing an item at a merchant with a checkout lane) or the customer 102 may enter the payment amount after receiving an item (e.g., after consuming a meal at the merchant 106).

At 1210, the mobile device 104 receives the indication of the payment amount to be provided to the merchant 106.

At 1212, the mobile device 104 may send, over the network 108, instructions to transfer the payment amount from an account associated with the customer 102 (e.g., financial account 218) to an account associated with the merchant 106 (e.g., financial account 210). Receipt of the payment amount at 1210 and providing the payment instructions at 1212 may be implemented by the payment module 414.

At 1214, mobile device 104 receives a receipt for the payment amount. The receipt may include verification data 206 previously selected by the merchant 106 and an authentication challenge 208 for accessing the verification data 206. An illustrative receipt is shown in FIG. 7. The receipt may be provided by the network-accessible computing device(s) 110 in response to the merchant 106 (i.e., the financial account 210 associated with the merchant 106) receiving the payment amount. Although the mobile device 104 has received the receipt at 1214, the receipt may remain concealed or not displayed on the mobile device 104 at this point.

At 1216, the merchant 106 provides a response to the authentication challenge 208 received at 1214. Since the merchant 106 previously designated the authentication challenge 208 (e.g., his or her PIN code) the merchant 106 will be able to provide a valid response.

At 1218, a valid response to the authentication challenge 208 is received by the mobile device 104.

At 1220, in response to receiving the valid response, the verification data 206 may be presented to the merchant 106 on the mobile device 104. Presentation of the verification data 206 may be implemented by showing a picture, showing a text string, playing a sound, displaying a machine-readable code, or the like. The merchant 106 is able to observe the verification data 206, and thereby, verify that other information included in the receipt is authentic.

At 1222, the merchant 106, may check the verification data 206 and provide an indication that the item for which the payment was received was provided to the customer 102.

At 1224, the mobile device 104 receives the indication from the merchant 106 that the item was provided to the customer 102. The mobile device 104 may then close out the transaction by sending a notification to the customer account 314 that this transaction is completed. The notification may include receipt information other than the merchant's verification data 206 (e.g., price, identity of the item, date and time).

At 1226, the merchant 106 may additionally input a command to block subsequent presentation of the verification data 206 on the mobile device 104. The blocking may be implemented by instructions to the payment application on the mobile device 104, by encrypting the verification data 206, by deleting the verification data 206 from the mobile device 104, or by another technique that prevents subsequent presentation of the verification data 206 even if a valid response to the authentication challenge 208 is subsequently received by the mobile device 104.

At 1228, the mobile device 104 receives a command to block subsequent presentation of the verification data 206.

At 1230, the mobile device 104 blocks subsequent presentation of the verification data 206 so that a subsequent valid response to the authentication challenge 208 does not cause a subsequent presentation of the verification data.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
under control of a mobile device of a customer, the mobile device being configured with executable instructions,
presenting, via the mobile device to the customer, a list of one or more merchants that have each established an account with an online service that processes electronic payments from mobile devices;
receiving, by the mobile device from the customer, a selection of a merchant from the list of one or more merchants;
receiving, by the mobile device from the customer, an indication of a payment amount for an item provided by the merchant;
sending, from the mobile device and over a network, an instruction to transfer the payment amount from an account associated with the customer to an account associated with the merchant;
at least partly responsive to the account associated with the merchant receiving the payment amount from the account associated with the customer, receiving, by the mobile device via the network, (i) a receipt for the payment amount, (ii) verification data previously selected by the merchant such that the merchant is familiar with the verification data, and an authentication challenge previously selected by the merchant for accessing, by the merchant, the verification data with the mobile device;
receiving, by the mobile device from the merchant, a valid response to the authentication challenge;
at least partly responsive to receiving the valid response, causing the verification data to be presented via the mobile device to the merchant thereby assuring the merchant that the payment amount has been successfully transferred from the account associated with the customer to the account associated with the merchant;
receiving, by the mobile device from the merchant, an indication that the item was provided to the customer;
receiving, by the mobile device from the merchant, a command to block subsequent presentation of the verification data without a subsequent payment transferred from the account associated with the customer to the account associated with the merchant; and
at least partly responsive to the command, blocking subsequent presentation of the verification data so that a subsequent valid response to the authentication challenge does not cause a subsequent presentation of the verification data by the mobile device incorrectly indicating that a subsequent payment amount has been transferred from the account associated with the customer to the account associated with the merchant.

2. The method as recited in claim 1, wherein individual ones of the one or more merchants included in the list of the one or more merchants is selected based at least in part on having a name that matches at least in part a name entered by the customer into the mobile device or being within a predefined distance of a location of the mobile device.

3. The method as recited in claim 1, wherein the verification data is changed by the merchant at a regular frequency specified by the merchant.

4. The method as recited in claim 1, wherein a single input from the merchant comprises both the indication that the item was provided to the customer and the command to block subsequent presentation of the verification data.

5. One or more computer-readable media storing computer-executable instructions configured to cause one or more processors on a mobile device of a customer to:
receive an identification of a merchant to receive a payment at an account the merchant has established with an online service that processes electronic payments from mobile devices;
receive, from the customer, an identification of a payment amount to pay the merchant;
send an instruction for an account associated with the customer to transfer the payment amount to the account established by the merchant;
receive verification data that was previously selected by the merchant such that the merchant is familiar with the verification data and thereby indicating that the account established by the merchant received the payment amount; and
cause the verification data to be presented on the mobile device of the customer to the merchant as a portion of a receipt indicating the payment amount thereby assuring the merchant that the payment amount has been successfully transferred from the account associated with the customer to the account established by the merchant.

6. The computer-readable storage media as recited in claim 5, wherein receiving the identification of the merchant comprises receiving a merchant identifier entered by the customer, receiving data obtained at least in part from a scan of a machine-readable tag, or receiving a geographic location of the merchant.

7. The computer-readable storage media as recited in claim 5, wherein the payment amount is determined based at least in part on a payment amount entered by the customer.

8. The computer-readable storage media as recited in claim 5, wherein the verification data comprises a recent purchase history of the merchant, a list of contacts of the merchant, or a social graph of connections of the merchant in one or more social networks.

9. The computer-readable storage media as recited in claim 5, wherein the verification data comprises machine-readable data which, when read by a tag reader at the merchant, indicates if the verification data is valid or invalid.

10. The computer-readable storage media as recited in claim 9, wherein the verification data further comprises a transaction identifier that, when read by the tag reader at the merchant, is stored in computer-readable media associated with the tag reader at the merchant such that subsequent reading of the verification data associated with the same transaction identifier is indicated as invalid by the tag reader at the merchant.

11. The computer-readable storage media as recited in claim 5, wherein the computer-executable instructions are further configured to cause the one or more processors to:
input, by the merchant on the mobile device of the customer, a confirmation of provision of an item or a service to the customer.

12. The computer-readable storage media as recited in claim 5, wherein the computer-executable instructions are further configured to cause the one or more processors to cause the verification data to be presented on the mobile device of the customer by:
receiving an authentication challenge for accessing the verification data;
determining when a response from the merchant on the mobile device of the customer to the authentication challenge is valid; and causing the verification data to be presented to the merchant on the mobile device of the customer in response to the response being determined to be valid.

13. The computer-readable storage media as recited in claim 12, wherein the authentication challenge comprises a request to provide a password, a personal identification number (PIN), a physical gesture, a spoken phrase, or a biometric identifier.

14. The computer-readable storage media as recited in claim 12, wherein the computer-executable instructions are further configured to cause the one or more processors to:
receive, from the merchant, a command to block subsequent presenting of the verification data; and
at least partly responsive to the command, block subsequent presenting of the verification data.

15. A mobile device comprising:
one or more processors;
computer-readable media coupled to the one or more processors;
a merchant identification module stored in the computer-readable media and configured to receive information identifying a merchant that has established an account with an online service that processes electronic payments from mobile devices;
a payment module stored in the computer-readable media and configured to receive an indication of a payment amount and provide instructions to transfer the payment amount from an account associated with a customer that possesses the mobile device to the account established by the merchant;
a verification data module stored in the computer-readable media and configured to receive (i) verification data selected by the merchant such that the merchant is familiar with the verification data for indicating that the account established by the merchant received the payment amount from the account associated with the mobile device and (ii) an authentication challenge from the merchant associated with the verification data; and
a merchant authentication module stored in the computer-readable media and configured to receive a response to the authentication challenge entered by the merchant on the mobile device and, at least partially responsive to receiving a valid response, cause the verification data to be presented to the merchant on the mobile device as a portion of a receipt indicating the payment amount thereby assuring the merchant that the payment amount has been successfully transferred from the account associated with the mobile device to the account established by the merchant.

16. The mobile device as recited in claim 15, wherein the mobile device comprises a smart phone, a personal digital assistant, a media player, a portable gaming device, an eBook reader, or a tablet computer.

17. The mobile device as recited in claim 15, further comprising a location sensor coupled to the one or more processors and configured to detect a geolocation of the mobile device, wherein the merchant identification module is further configured to identify the merchant based at least in part by comparing the geolocation of the mobile device to a location of the merchant.

18. The mobile device as recited in claim 15, further comprising a tag scanner coupled to the one or more processors and configured to identify a merchant based at least in part on data obtained from a tag scanned by the tag scanner and provide the data identifying the merchant to the merchant identification module.

19. The mobile device as recited in claim 18, wherein the tag scanner comprises a camera, a reflected light scanner, or an antenna configured to receive signals from radio frequency identification (RFID) tags.

20. The mobile device as recited in claim 15, wherein the verification data module is further configured to:
receive, from the merchant, a command to block subsequent presenting of the verification data; and
at least partly responsive to the command, blocking subsequent presenting of the verification data.

21. A system comprising:
one or more processors;
computer-readable media coupled to the one or more processors;
one or more network interfaces coupled to the one or more processors;
a merchant account record stored in the computer-readable media including (i) an identity of a merchant that has established an account with an online service that includes the system and that processes electronic payments from mobile devices, (ii) verification data selected by the merchant such that the merchant is familiar with the verification data, and (iii) an authentication challenge provided by the merchant;
a transaction processing module stored in the computer-readable media and configured to receive, via the one or more network interfaces, a request from a mobile device of a customer to transfer a payment amount from a financial account associated with the customer to the financial account established by the merchant; and
a payment confirmation module stored in the computer-readable media and configured to send, via the one or more network interfaces, (i) the verification data and (ii) the authentication challenge to the mobile device of the customer in response to receiving an indication that the financial account established by the merchant received the payment amount from the financial account associated with the customer, the verification data remaining concealed on the mobile device until a valid response to the authentication challenge is provided by the merchant on the mobile device of the customer.

22. The system of claim 21, further comprising an encryption module stored in the computer-readable media and configured to encrypt the verification data with a private key of the merchant for decryption by a corresponding public key of the merchant on the mobile device.

23. The system of claim 21, further comprising an encryption module stored in the computer-readable media and configured to encrypt the verification data so that a device at the merchant other than the mobile device is able to decrypt the verification data and the mobile device is not able to decrypt the verification data.

24. The system of claim 21, further comprising a customer account record stored in the computer-readable media and comprising an identity of the customer and the financial account associated with the customer, and wherein the merchant account record comprises an identity of the financial account associated with the merchant.

25. The system of claim 21, wherein the payment confirmation module is further configured to:
receive, from the merchant, a command to block subsequent presenting of the verification data; and at least partly responsive to the command, blocking subsequent presenting of the verification data.

* * * * *